(12) United States Patent
Pflueger et al.

(10) Patent No.: US 12,093,274 B2
(45) Date of Patent: Sep. 17, 2024

(54) CLIENT-SIDE MASS DATA SELECTION SYSTEM

(71) Applicant: SAP SE, Walldorf (DE)

(72) Inventors: Jens Pflueger, Karlsruhe (DE); Georg Christoph, Karlsruhe (DE); Vincent Escalier, Chatou (FR); Alexander Deutschmann, Leimen (DE); Jay Barbhaiya, Heidelberg (DE); Dirk Becker, Ostringen (DE)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 17/949,009

(22) Filed: Sep. 20, 2022

(65) Prior Publication Data

US 2024/0095254 A1    Mar. 21, 2024

(51) Int. Cl.
*G06F 16/248*    (2019.01)
*G06F 3/0482*    (2013.01)
*G06F 3/0484*    (2022.01)
*G06F 16/25*    (2019.01)

(52) U.S. Cl.
CPC .......... *G06F 16/248* (2019.01); *G06F 3/0482* (2013.01); *G06F 3/0484* (2013.01); *G06F 16/252* (2019.01)

(58) Field of Classification Search
None
See application file for complete search history.

(56) References Cited

U.S. PATENT DOCUMENTS

| | | |
|---|---|---|
| 9,176,645 B1 | 11/2015 | Masterman et al. |
| 2011/0258575 A1 | 10/2011 | Cupp et al. |
| 2016/0378346 A1* | 12/2016 | Byers .................... G06F 3/0659 707/827 |
| 2017/0286229 A1* | 10/2017 | Cheung ............... G06F 11/1474 |
| 2019/0369130 A1* | 12/2019 | Asakura ................. G01N 35/10 |

FOREIGN PATENT DOCUMENTS

CN     1929488 A     3/2007

OTHER PUBLICATIONS

Communication: "Extended European Search Report", Feb. 22, 2024 (Feb. 22, 2024), European Patent Office, for European Application No. 23185779.8-1203, 8 pages.

* cited by examiner

*Primary Examiner* — Thu N Nguyen
(74) *Attorney, Agent, or Firm* — Buckley, Maschoff & Talwalkar LLC

(57) ABSTRACT

Systems and methods include presentation of a subset of a result set of items received from a remote system, reception of a command to perform an operation on all items of the result set while presenting the subset, and determination, in response to the command, of whether a total number of items in the result set exceeds a threshold value. If it is determined that the total number of items in the result set exceeds the threshold value, a first request is transmitted to the remote system to perform the operation on all items of the result set, where the first request includes filter values associated with the result set. If it is determined that the total number of items in the result set does not exceed the threshold value, a second request is transmitted to the remote system to perform the operation on all items of the result set, where the second request includes an identifier of each item of the result set.

20 Claims, 12 Drawing Sheets

Data Exploration

Data Source: Table1A ▼  ProductName ▼  shirt ▼

+ Add Filter

| | Product Name | Sales |
|---|---|---|
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |
| ☐ | ~~~~~~~~~~~ | ~~~~~~~~~~~ |

Items 1-8 of 20

[ Delete ]  [ Move ]  [ Copy ]

Data Exploration

Data Source: Table1A ▼    ProductName ▼    shirt ▼
+ Add Filter

| ☐ | Product Name | Sales |
|---|---|---|
| ☑ | ~~~~~~~~~~~ | ~~~~~~~~~~~ |
| ☐ | ~~~~~~~~~~~ | ~~~~~~~~~~~ |
| ☑ | ~~~~~~~~~~~ | ~~~~~~~~~~~ |
| ☑ | ~~~~~~~~~~~ | ~~~~~~~~~~~ |
| ☐ | ~~~~~~~~~~~ | ~~~~~~~~~~~ |
| ☑ | ~~~~~~~~~~~ | ~~~~~~~~~~~ |
| ☑ | ~~~~~~~~~~~ | ~~~~~~~~~~~ |
| ☑ | ~~~~~~~~~~~ | ~~~~~~~~~~~ |

Items 1-8 of 20    [ Delete ]  [ Move ]  [ Copy ]

*FIG. 6*

CLIENT-SIDE MASS DATA SELECTION SYSTEM

BACKGROUND

Modern computing systems generate and store vast amounts of data. This data is often stored in a structured format, such as in database tables conforming to a particular data schema. A client device may execute an application to allow a user to view and potentially edit the stored data.

Such an application typically allows a user to specify one or more filter values describing attributes of a set of items which the user would like to view. The items may be specific rows of a database table. The application queries a backend database system using the filter values and the database system returns a result set including the items to the client device. The user may further operate the application to request operations on the result set.

Due to performance reasons, the number of items of the result set which are actually provided to the client device in response to the query is limited. For example, the number may be limited to the number of items which can be rendered simultaneously on the client device, or a slightly greater number. As the user scrolls down through the rendered items, additional items are fetched from the backend and rendered. In another example, the returned items are rendered within "pages" (e.g., "page 1 of 3"), the number of received items is limited to the number which can be displayed on a single page, and the client device only stores one page of items at a given time.

A user may wish to perform an operation (e.g., delete, copy) on the result set of items. Accordingly, the user selects a Select All user interface control and the user interface indicates that the currently-displayed items are selected. If other items of the result set have been received and are currently stored on the client device, those other items are also selected. The user then inputs a command to perform an operation on the selected items, and the command is performed only on the items currently selected on the client device. Contrary to the user's reasonable expectations upon selecting Select All, the operation is not performed on items of the result set which are not stored on the client device. This operation may lead to misunderstanding, confusion and errors.

Due to the large number of items in some result sets, it is not practical to load all items to the client device in order to support the expected Select All functionality. Therefore, in order to perform an operation on all items of a large result set, the user must independently select subsets of the items and perform the operation on each subset separately. This approach is time-consuming and can be frustrating.

As an alternative, some applications provide dedicated user interfaces for batch processing of large numbers of items. These user interfaces are separate from and operated differently than the above-described user interfaces, which are typically used to view and modify items. Requiring different user interfaces for similar tasks decreases the usability of the applications and increases the cognitive load on the user.

BRIEF DESCRIPTION OF THE DRAWINGS

FIG. 4 is a user interface presenting items of a result set according to some embodiments.

FIG. 5 is a user interface presenting selection of items of a result set according to some embodiments.

FIG. 6 is a user interface presenting de-selection of items of a result set according to some embodiments.

DETAILED DESCRIPTION

The following description is provided to enable any person in the art to make and use the described embodiments. Various modifications, however, will remain readily-apparent to those in the art.

Some embodiments provide unified handling of "Select All" functionality for large or small datasets in client-server architectures, where selection is handled on a front-end client device. Embodiments may therefore avoid the need for a separate user interface specifically-intended for bulk dataset operations.

As described above, a client-side user interface may display all or a subset of items of a result set. Upon selection of a "Select All" control, and if the number of items of the result set is less than or equal to a configurable threshold number of items, any items of the result set which are not yet loaded to the client system are loaded to the client system and all items of the result set selected. Operations may then be performed on the selected items in a conventional manner. For example, a client-side application may transmit a command to a backend system instead of a list of the individual items of the result set and requesting deletion thereof.

However, if the number of items of a result set exceeds the threshold, no additional items are loaded to the client system upon selection of a "Select All" control. Rather, an indication is presented indicating that all items of the result set have been selected. Upon receipt of a user command to perform an operation on the selected items, the client-side application transmits a command to a backend system including filter values which describe the result set, instead of a list of individual items. Therefore, loading all individual items of the result set from the backend to the client system is not required.

Eliminating the need to load all the items to a client system in response to a Select All command results in a performance benefit. Misunderstandings and confusion which may occur when performing "Select All" operations on partially-loaded result sets are also avoided. Moreover, the appearance and behavior of the user interface remains substantially the same independent of the size of a result set, providing consistency for the user. Embodiments may also eliminate the need to perform an operation action multiple times on smaller portions of the result set.

Figure 1:
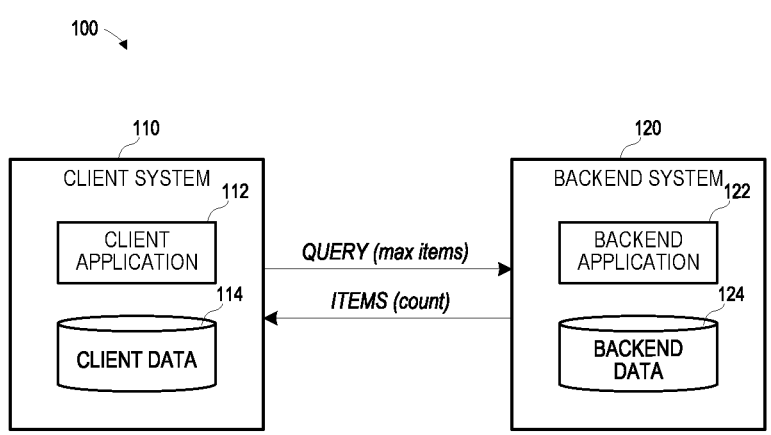
FIG. 1 is a block diagram illustrating a query and a response exchanged by a client system and a backend system according to some embodiments.

FIG. 1 is a block diagram of system 100 according to some embodiments. Each illustrated component of system 100 may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more components of system 100 are implemented by a single computing device, and/or two or more components of system 100 are co-located. One or more components of system 100 may be implemented using cloud-based resources, and/or other systems which apportion computing resources elastically according to demand, need, price, and/or any other metric.

Client system 110 may comprise a computing device such as, but not limited to, a desktop computer, a laptop computer, a smartphone and a tablet computer. Client system 110 may store and execute program code of software applications such as client application 112. Client data 114 may include data (e.g., document files, spreadsheet files) used by such applications to provide functionality to a user operating client system 112. Client data 114 is stored on a persistent storage device (e.g., a hard drive), which may also store program code of applications, operating system files, device drivers, etc.

Client application 112 operates to retrieve data stored at a remote system for presentation on a display device (not shown) of client system 110. Client application 112 may comprise a standalone application which issues calls (e.g., APIs, Web service calls) to a remote system to acquire specified data and to request operations on the data. Client application 112 may comprise a Web application designed for execution within a Web browser executing on client system 110. Such a Web application may be built upon a framework of pre-existing code libraries as will be described below.

Backend system 120 executes backend application 122 to receive requests from client application 112 and provide responses thereto based on backend data 124. Backend data 124 may comprise tables conforming to a data schema as is known in the art. In some embodiments, backend system 120 is a database system and backend application 122 is a query server or other data service provider. Backend system 120 and backend application 122 may be configured to receive and respond to queries received in parallel from many users operating many disparate client systems.

Backend system 120 may comprise one or more computer servers located proximate to or remote from one another. Accordingly, backend application 122 and backend data 124 may be implemented in a single-node or distributed manner. In some embodiments, backend application 122 is implemented using geographically-distributed and redundant cloud compute nodes and backend data 124 is implemented using geographically-distributed and redundant cloud storage nodes.

As illustrated in FIG. 1, a user may operate client system 110 to cause client application 112 to transmit a query to backend system 120. The query may comprise a request which specifies desired data of backend data 124 and conforms to any suitable protocol. The query may be transmitted along with an indicator of a maximum number of items to be returned to client application 112. The maximum number may be configured within client application 112. The configured maximum number may be directly related to the random access memory size and performance level of client system 110 and the network bandwidth between client system 110 and backend system 120, and inversely related to the expected size of each item and the expected time required by backend system 120 to process the query, for example.

Assuming suitable authentication and authorization of the user, backend application 122 generates a result set of items of backend data 124 in response to the query as is known in the art. Backend application 122 then returns the items, up to the maximum number, to client application 112. Each returned item may comprise, for example, a row of data (i.e., column values) of a database table, an entry of a list of items, or a node of a hierarchical tree structure. Each returned item may therefore comprise data which somehow represent an individual logical entity of the generated result set.

In some embodiments, backend application 122 also returns a count of the total number of items of the generated result set. Client application 112 stores the returned items in memory and displays the items to the user. The number of displayed items may be fewer than the number of received items due to, for example, user interface space constraints. Client application 112 may also display the count of the total number of items of the result set, particularly if the total count is greater than the number of displayed items.

It will now be assumed that the user manipulates a user interface control to select all of the items of the result set. If the number of items of the result set is less than or equal to a configured threshold (which may differ from the threshold mentioned above), client application 112 presents indicators indicating that the presented items have been selected. Next, the user instructs client application 112 to perform an operation on the selected items.

Figure 2A:
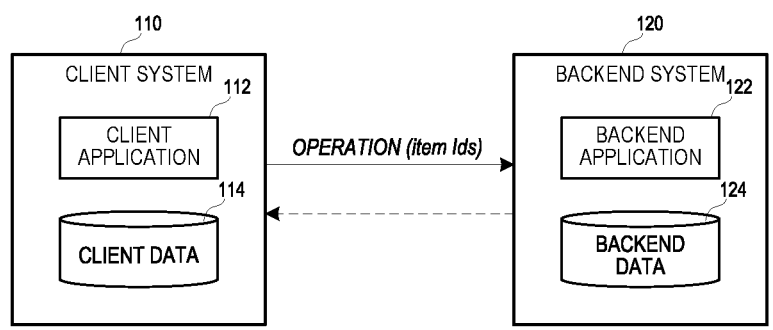
FIG. 2A is a block diagram illustrating a first request to perform an operation on selected result set items according to some embodiments.

As illustrated in FIG. 2A, client application 112 transmits a corresponding request to execute the operation to backend application 124 and includes a list of item identifiers which identify the items on which the operation is to be executed. Client application 112 is aware of the item identifiers of the result set because the items are currently loaded on client system 110. If the number of items which are currently loaded on client system 110 is less than the full result set, the remaining items of the result set are requested and retrieved from backend application 122 prior to transmitting the request to execute the operation. Backend application 122 performs the operation on corresponding backend data 124 and returns a confirmation.

Figure 2B:
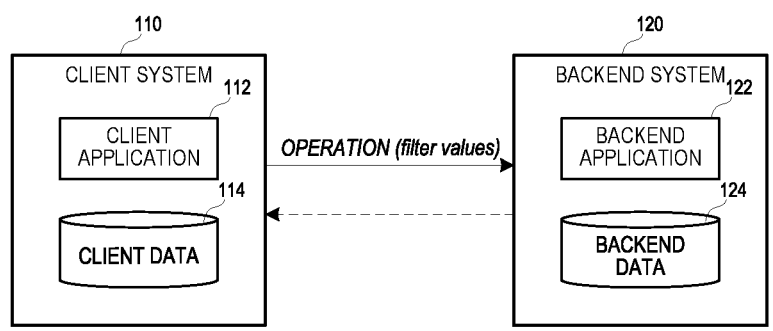
FIG. 2B is a block diagram illustrating a second request to perform an operation on a large number of selected result set items according to some embodiments.

FIG. 2B illustrates a scenario in which the number of items of the result set is greater than the configured threshold. Upon issuing a command to client application 112 to select all of the items of the result set, client application 112 again presents indicators indicating that the presented items have been selected. Client application 112 may also present an indication of the current filter values behind the result set (i.e., the filter values used to filter the data source to generate the result set), examples of which are further described below.

Next, instead of transmitting item identifiers along with the request to perform an operation, client application 112 transmits the request and the filter values behind the result set of items to backend application 124. In response, backend application 122 identifies the selected items within backend data 124 using the filter values and performs the operation on the identified items. Accordingly, client application 112 may direct performance of the operation on all items of the result set without first requiring the transmission of all the items from backend application 122 to client application 112.

Figure 3:
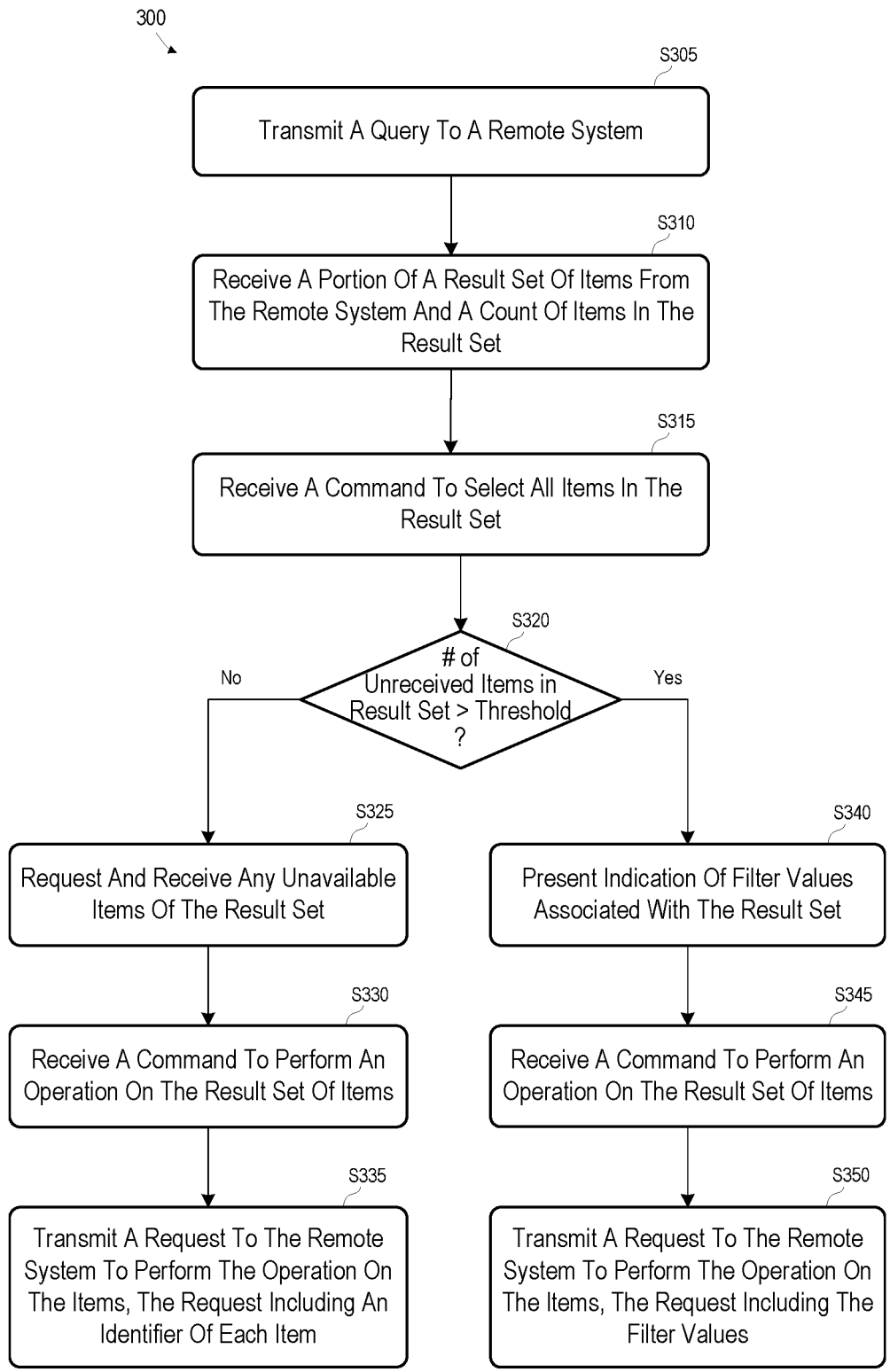
FIG. 3 is a flow diagram of a process to select all items in a result set and to transmit a request to perform an operation on the selected items according to some embodiments.

FIG. 3 is a flow diagram of a process to select all items in a result set and to transmit a request to perform an operation on the selected items according to some embodiments. Process 300 may be performed using any suitable combination of hardware and software. Software program code embodying this process may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S305, a client application transmits a query to a remote system. For example, a user may operate a database client application to construct a query on a particular data source (e.g., a database table) and to transmit a query to a remote database system at S310. As described above, the client application may also transmit an indicator of a maximum number of items to be returned to the client application.

The remote system executes the query as is known in the art to generate a result set including a plurality of items. At S310, the client application receives a portion of the plurality of items and a count of the total number of items in the result set from the remote system. The portion may include up to the maximum number of items specified by the client application. In some embodiments, the maximum number of items need not be specified by the client application. Rather, the remote system is aware of the maximum number of items (e.g., 25 items per page) and therefore limits the transmitted portion to this maximum number of items.

The client application presents the received portion of result set items to a user. FIG. 4 is a view of user interface 400 of a client application presenting a plurality of items according to some embodiments. Drop-down menus 410 of interface 400 allow a user to specify a data source (i.e., Table1A), an attribute/filter (i.e., ProductName) and a filter value (i.e., "shirt"). This information may be used in the query submitted to the remote system. Embodiments are not limited to interface 400.

Each row of table 420 represents an item of the result set received at S310. Text 430 indicates the number of currently-displayed items (i.e., 8) and the total number of items in the result set (i.e., 20). Scroll bar 440 further indicates that the displayed items are less than all of the items in the result set. According to some embodiments, and in response to user manipulation of scroll bar 440 to scroll downward, the client application requests and receives additional items of the result set from the remote system and displays those items below the currently-displayed items.

Each of checkboxes 450 of interface 400 allows a user to select an adjacent item. Checkbox 460 is a "Select All" control which, if selected, causes automatic selection of each of checkboxes 450. Delete control 470, Move control 480 and Copy control 490 are disabled because no items have been selected upon which such operations may be performed.

Figure 5:
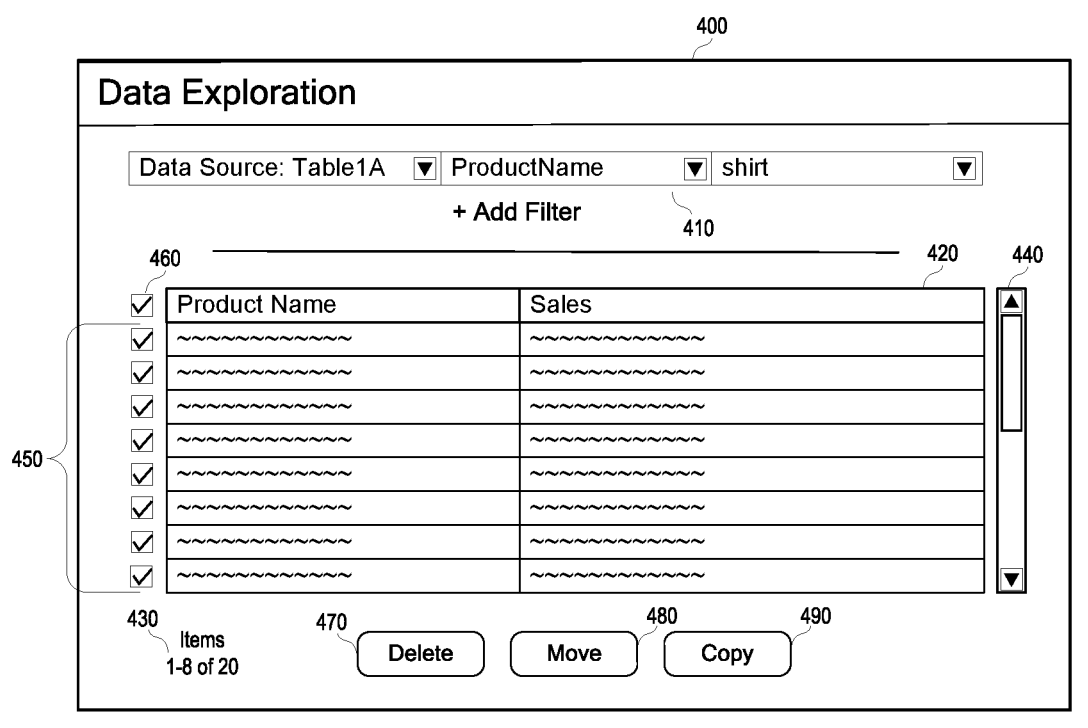

Returning to process 300, a command is received at S315 to select all items in the result set. This command may be input to the client application via any user interface control or action that is or becomes known. FIG. 5 illustrates user selection of checkbox 460 at S315, which results in selection of all checkboxes 450. Moreover, FIG. 5 shows controls 470-490 as now enabled.

In response to the command received at S315, it is determined whether the number of items in the result set which have not been received by the client application is greater than a threshold. It will be assumed that the threshold is 100 unreceived items and therefore, in the present example, flow proceeds from S320 to S325. In some embodiments, S315 may comprise a determination of whether the total number of items in the result set is greater than a threshold.

At S325, any items of the result set which are currently not available to the client application (i.e., not currently stored on the client system) are requested and retrieved from the remote system. In the present example, the twelve items of the result set which are not presented by interface 400 may have not yet been received from the remote system. Accordingly, these twelve items are requested and received by the client application at S325.

A command to perform an operation on the result set of items is received at S330. In the present example, the user may select Delete control 470 at S330. FIG. 6 illustrates user manipulation of interface 400 to de-select the second and fifth items by de-selecting their adjacent checkboxes 450 prior to S330. This de-selection also causes de-selection of checkbox 460. FIG. 6 is intended to illustrate that the operation commanded at S330 need not apply to all items in the result set.

Figure 7:
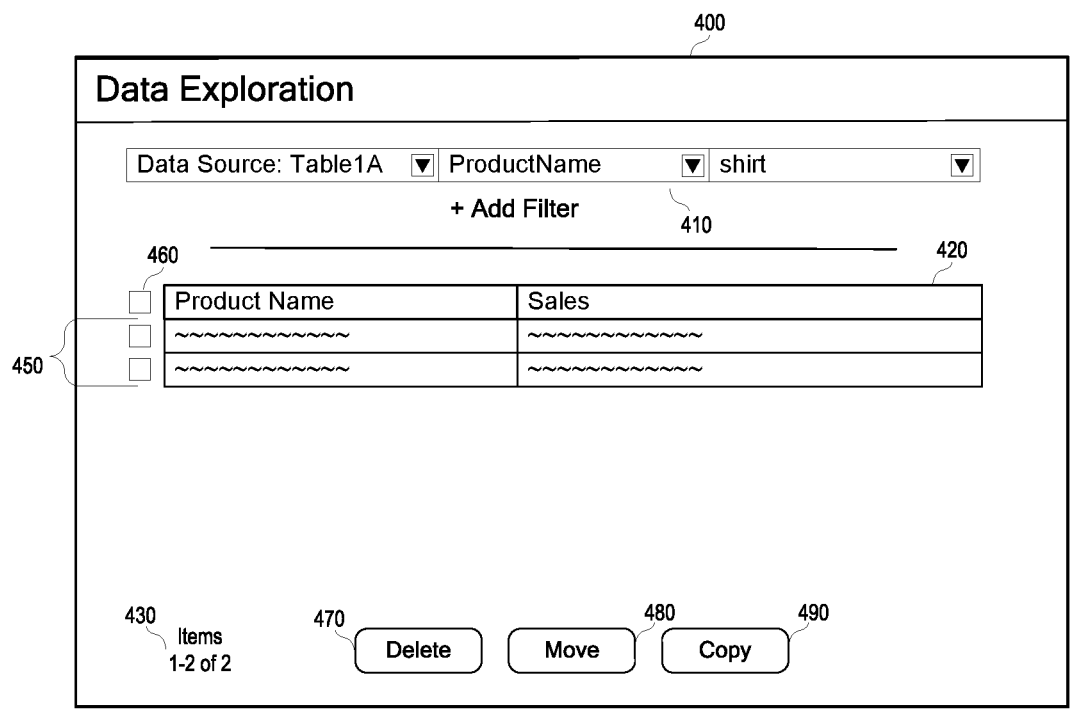
FIG. 7 is a user interface presenting items of a result set after a deletion operation according to some embodiments.

In response to the command received at S330, a request is transmitted to the remote system at S335 to perform the operation on the selected items. The request includes a list of item identifiers which identify the items on which the operation is to be executed. As mentioned above, the item identifiers are known because all items of the result set have been acquired by the client application. The remote system then performs the requested operation on the identified items. FIG. 7 illustrates interface 400 after S335 according to the present example. Upon receiving confirmation of the executed delete operation, interface 400 now shows only the two items which were de-selected as described with respect to FIG. 6. Moreover, text 430 indicates that only two items remain in the result set which corresponds to the data source and filter value specified in area 410.

Figure 8:
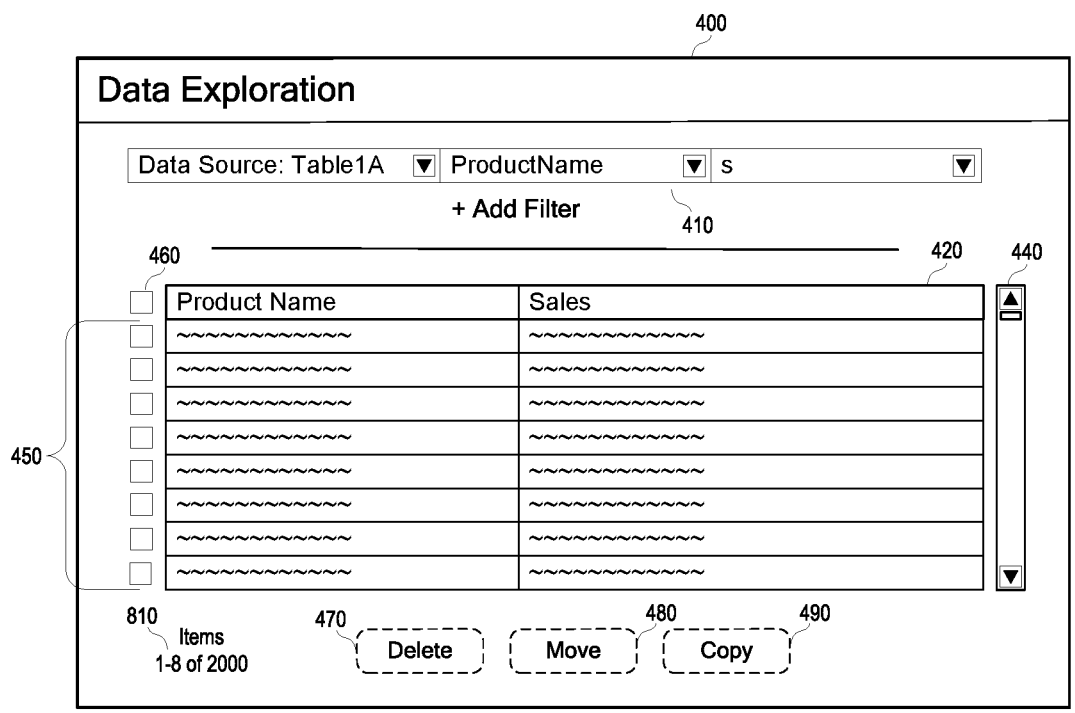
FIG. 8 is a user interface presenting items of a result set according to some embodiments.

It will now be assumed that a different query is transmitted to the remote system at S305 and a corresponding portion of a result set and total count are received at S310. FIG. 8 is a view of user interface 400 presenting the received portion of result set items to a user of a client application according to some embodiments. Drop-down menus 410 of interface 400 allow a user to specify a new filter value (i.e., "s") and text 810 indicates the number of currently-displayed items (i.e., 8) and the total number of items in the result set (i.e., 2000). Scroll bar 440 again indicates that the displayed items are less than all of the items in the result set, and may be manipulated to cause the client application to operate as described above.

At S315, checkbox 460 is selected to select all items of the result set. Next, it is determined at S320 that the number of unreceived items is greater than the threshold. Flow therefore proceeds to S340 to present an indication of filter values associated with the result set.

Figure 9:
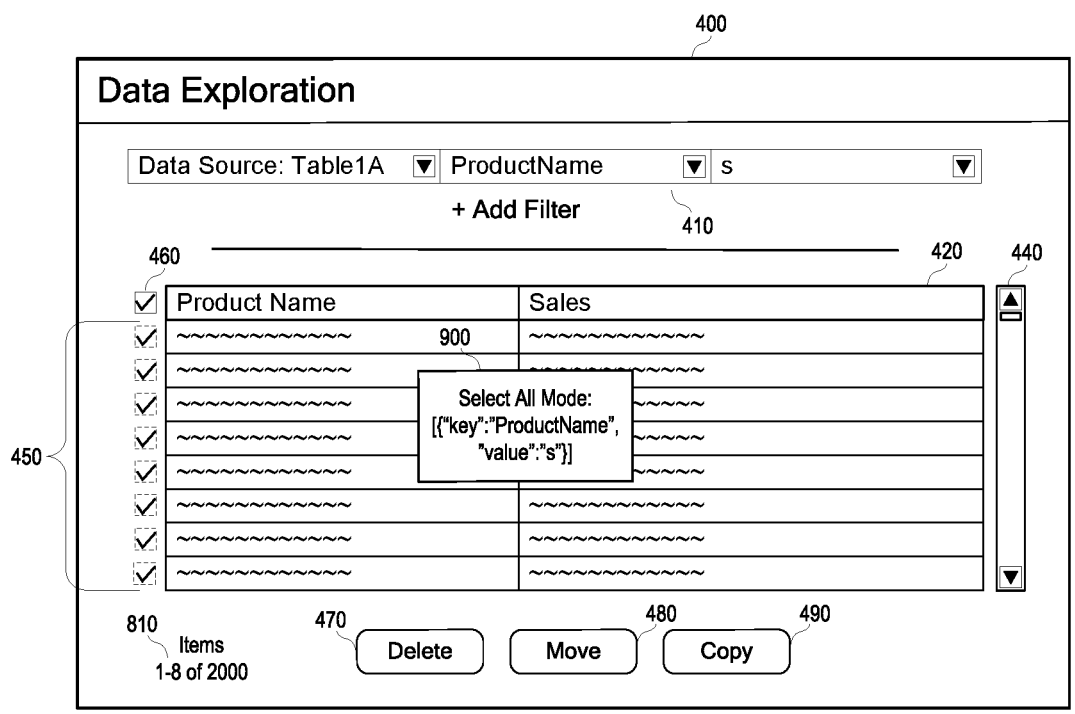
FIG. 9 is a user interface presenting selection of items of a result set and filter values associated with the result set according to some embodiments.

FIG. 9 illustrates selection of checkbox 460 at S315 as described above. Each of checkboxes 450 are selected in response to selection of checkbox 460. Also in response to selection of checkbox 460, and because the number of unreceived items is greater than the threshold, each of checkboxes 450 are disabled to prevent user de-selection thereof.

User interface 400 presents graphical indication 900 at S340 to facilitate user understanding of the Select All operation. In particular, indication 900 indicates filter values which define the complete set of items which have been selected by the Select All operation.

A command to perform an operation on the result set of items is received at S345. This command may be initiated via any of now-enabled controls 470-490 shown in FIG. 9. In response to the command, a request is transmitted to the remote system at S350 to perform the operation on the selected items. The request includes the filter values associated with the result set of items. The remote system identifies the selected items using the filter values and performs the operation on the identified items.

Figure 10:
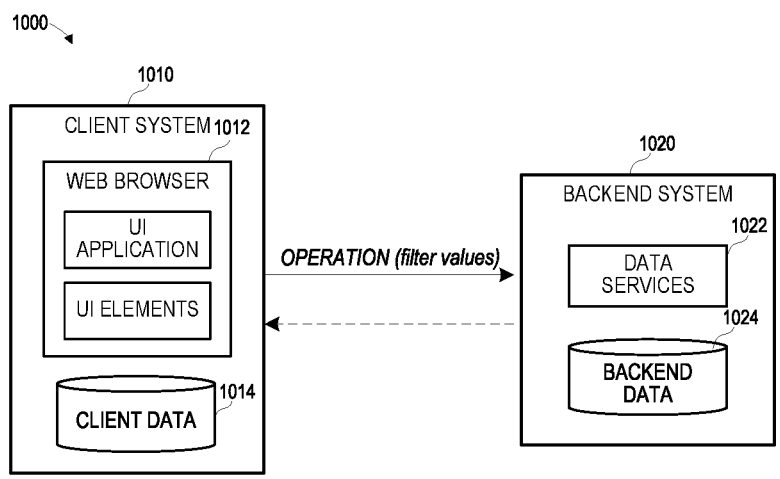
FIG. 10 is a block diagram of a client system transmitting a request to a backend system to perform an operation on a large number of selected result set items according to some embodiments.

FIG. 10 is a block diagram of system 1000 according to some embodiments. System 1000 represents an architecture in which a client application is a user interface application executing within Web browser 1012 of client system 1010. The user interface application may utilize a client-side framework consisting of program code of various user interface elements. The framework may be based on Javascript and HTML but embodiments are not limited thereto. This implementation allows user interface rendering to be performed in the Web browser and for the logic of the user interface applications to be implemented in Javascript executed on the client system.

Backend system 1020 includes backend data 1024 as described above. Backend application 1022 described above is implemented as data services 1022, which may comprise REST and/or OData services exposed to user interface applications.

The user interface elements may include table, list and tree elements which control display and interaction with data structures in a client-server environment, such as item selection and triggering of actions on selected items. Accordingly, process 300 may be performed by program code of the user interface controls, except for S335 and S350, which may be performed by the user interface application.

Figure 11:
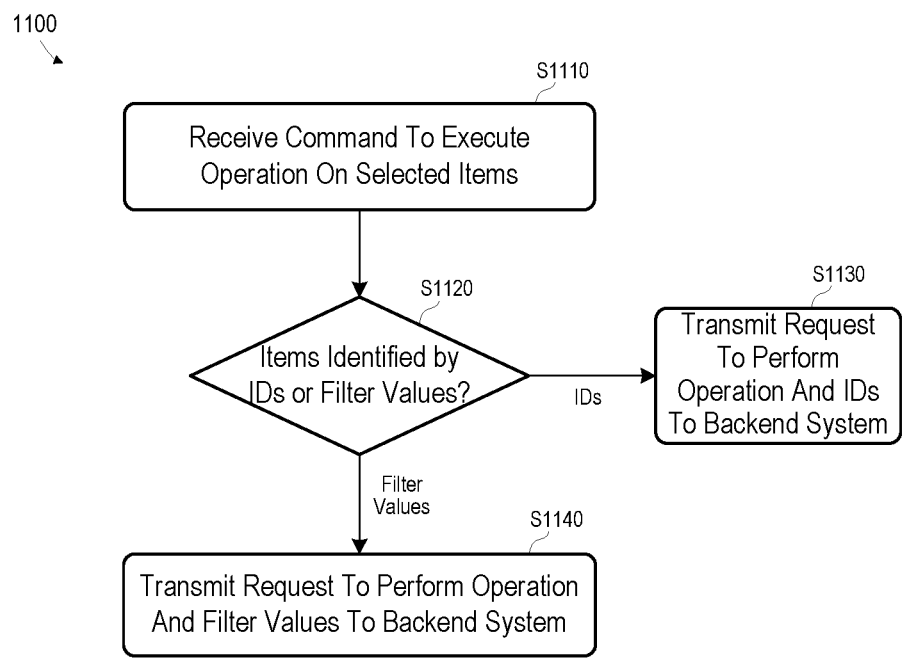
FIG. 11 is a flow diagram of a process of a user interface application to transmit a request to perform an operation on selected items according to some embodiments.

FIG. 11 is a flow diagram of process 1100 which may be executed by a user interface application according to some embodiments. At 51110, the user interface application receives a command from the user interface control layer to execute an operation on selected items. At S1120, the user interface application determines whether the command includes identifiers of the items or filter values. If the former, the user interface application transmits a request to perform the operation and the identifiers to a backend system at S1130, as described with respect to S335. If the received command includes filter values (or some other indication that the number of selected items is large), the user interface application transmits a request to perform the operation and the filter values to the backend system at S1140 as mentioned with respect to S350 of process 300.

Figure 12:
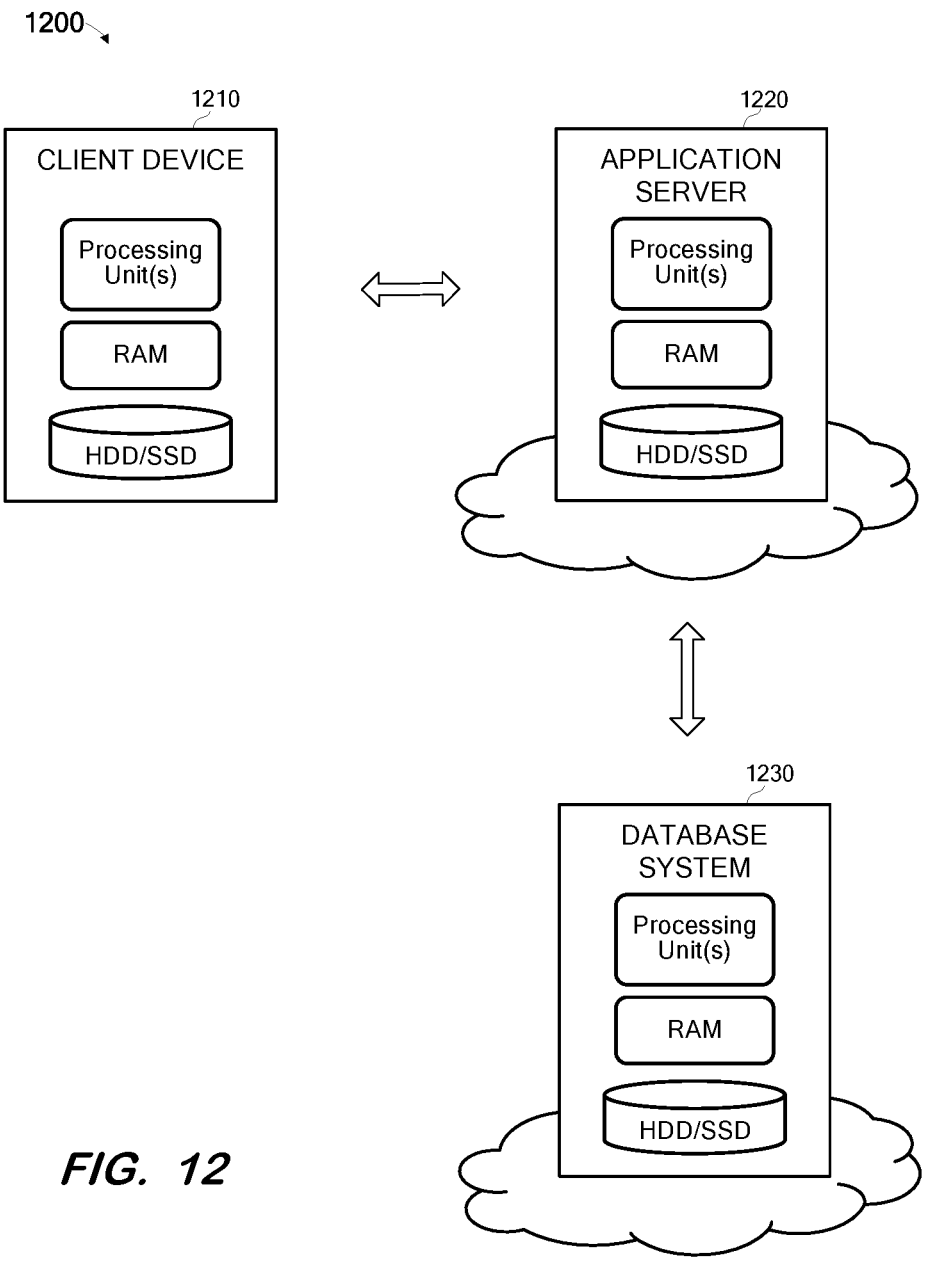
FIG. 12 is a block diagram of computing systems implementing a system according to some embodiments.

FIG. 12 is a block diagram of cloud-based system 1200 according to some embodiments. In this regard, application server 1220 and database system 1230 may comprise cloud-based compute resources, such as virtual machines, allocated by a public cloud provider providing self-service and immediate provisioning, autoscaling, security, compliance and identity management features.

Client device 1210 may execute a client application to communicate with data services executing on application server 1220. The client application may transmit a query to the data services, which retrieve a corresponding result set from database system 1230. The client application may function as described herein to allow a user to select all items of the result set and perform an operation thereon, whether or not all items of the result set have been loaded to client device 1210.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of architectures described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a memory storing processor-executable program code; and a processing unit to execute the processor-executable program code to cause the system to:
present a subset of a result set of items stored on a second system;
while the subset is presented, receive a command to perform an operation on all items of the result set;
in response to the command, determine whether a number based on a total number of items in the result set exceeds a threshold value;
if it is determined that the number based on the total number of items in the result set exceeds the threshold value, transmit a first request to perform the operation on all items of the result set, where the first request includes filter values associated with the result set; and
if it is determined that the number based on the total number of items in the result set does not exceed the threshold value, transmit a second request to perform the operation on all items of the result set, where the second request includes an identifier of each item of the result set.

2. A system according to claim 1, the processing unit to execute the processor-executable program code to cause the system to:
if it is determined that the number based on the total number of items in the result set does not exceed the threshold value, request any unreceived items of the result set prior to transmission of the second request.

3. A system according to claim 2, wherein the number based on the total number of items is equal to a number of items of the result set not received at the system.

4. A system according to claim 1, the processing unit to execute the processor-executable program code to cause the system to:
transmit a query including the filter values; and
receive the subset and the total number of items in response to the query.

5. A system according to claim 4, the processing unit to execute the processor-executable program code to cause the system to:
receive a second command prior to reception of the command, the second command to select all items of the result set;
in response to the second command, determine that the number based on the total number of items in the result set exceeds the threshold value; and
in response to the determination that the number based on the total number of items in the result set exceeds the threshold value, present the filter values while the subset is presented.

6. A system according to claim 5, wherein the number based on the total number of items is equal to a number of items of the result set not received at the system.

7. A system according to claim 1, the processing unit to execute the processor-executable program code to cause the system to:
if it is determined that the number based on the total number of items in the result set exceeds the threshold value, transmit the filter values associated with the result set to a user interface application, where the user interface application transmits the first request to perform the operation on all items of the result set; and
if it is determined that the number based on the total number of items in the result set does not exceed the threshold value, transmit the identifier of each item of the result set to the user interface application, where the user interface application transmits the second request to perform the operation on all items of the result set.

8. A computer-implemented method comprising:
presenting a subset of a result set of items received from a remote system;
while presenting the subset, receiving a command to perform an operation on all items of the result set;
in response to the command, determining whether a total number of items in the result set exceeds a threshold value;
if it is determined that the total number of items in the result set exceeds the threshold value, transmitting a first request to the remote system to perform the operation on all items of the result set, where the first request includes filter values associated with the result set; and
if it is determined that the total number of items in the result set does not exceed the threshold value, transmitting a second request to the remote system to perform the operation on all items of the result set, where the second request includes an identifier of each item of the result set.

9. A method according to claim 8, further comprising:
if it is determined that the total number of items in the result set does not exceed the threshold value, requesting any unreceived items of the result set prior to transmitting the second request.

10. A method according to claim 8, further comprising:
transmitting a query including the filter values to the remote system; and
receiving the subset and the total number of items from the remote system in response to the query.

11. A method according to claim 8, further comprising:
receiving a second command prior to reception of the command, the second command to select all items of the result set;
in response to the second command, determining that the total number of items in the result set exceeds the threshold value; and
in response to the determination that the total number of items in the result set exceeds the threshold value, presenting the filter values while presenting the subset.

12. A method according to claim 8, further comprising:
if it is determined that the total number of items in the result set exceeds the threshold value, transmitting the filter values associated with the result set to a user interface application, where the user interface application transmits the first request to perform the operation on all items of the result set; and
if it is determined that the total number of items in the result set does not exceed the threshold value, transmitting the identifier of each item of the result set to the user interface application, where the user interface application transmits the second request to perform the operation on all items of the result set.

13. A method according to claim 12, further comprising:
receiving a second command prior to reception of the command, the second command to select all items of the result set;
in response to the second command, determining that the total number of items in the result set exceeds the threshold value; and
in response to the determination that the total number of items in the result set exceeds the threshold value, presenting the filter values while presenting the subset.

14. A non-transitory computer-readable medium storing program code executable by a processing unit of a computing system causes the computing system to:
present a subset of a result set of items;

while the subset is presented, receive a command to perform an operation on all items of the result set;

in response to the command, determine whether a number based on a total number of items in the result set exceeds a threshold value;

if it is determined that the number based on the total number of items in the result set exceeds the threshold value, transmit a first request to perform the operation on all items of the result set, where the first request includes filter values associated with the result set; and if it is determined that the number based on the total number of items in the result set does not exceed the threshold value, transmit a second request to perform the operation on all items of the result set, where the second request includes an identifier of each item of the result set.

15. A medium according to claim 13, the program code executable by a processing unit of a computing system to cause the computing system to:

if it is determined that the number based on the total number of items in the result set does not exceed the threshold value, request any unreceived items of the result set prior to transmission of the second request.

16. A medium according to claim 15, wherein the number based on the total number of items is equal to a number of items of the result set not received.

17. A medium according to claim 14, the program code executable by a processing unit of a computing system to cause the computing system to:

transmit a query including the filter values; and receive the subset and the total number of items in response to the query.

18. A medium according to claim 17, the program code executable by a processing unit of a computing system to cause the computing system to:

receive a second command prior to reception of the command, the second command to select all items of the result set;

in response to the second command, determine that the number based on the total number of items in the result set exceeds the threshold value; and in response to the determination that the number based on the total number of items in the result set exceeds the threshold value, present the filter values while the subset is presented.

19. A medium according to claim 18, wherein the number based on the total number of items is equal to a number of items of the result set not received at the system.

20. A medium according to claim 14, the program code executable by a processing unit of a computing system to cause the computing system to:

if it is determined that the number based on the total number of items in the result set exceeds the threshold value, transmit the filter values associated with the result set to a user interface application, where the user interface application transmits the first request to perform the operation on all items of the result set; and if it is determined that the number based on the total number of items in the result set does not exceed the threshold value, transmit the identifier of each item of the result set to the user interface application, where the user interface application transmits the second request to perform the operation on all items of the result set.

* * * * *